United States Patent [19]

Smith

[11] Patent Number: 5,568,584
[45] Date of Patent: Oct. 22, 1996

[54] FIBER OPTIC CLOSURE WITH CABLE ADAPTER SPOOL

[75] Inventor: Donald J. Smith, Rancho Mirage, Calif.

[73] Assignee: PSI Telecommunications, Inc., Burbank, Calif.

[21] Appl. No.: 407,210

[22] Filed: Mar. 20, 1995

[51] Int. Cl.$^6$ .................................... G02B 6/00
[52] U.S. Cl. ........................ 385/135; 385/134; 385/136
[58] Field of Search .................................. 385/134–136, 385/62, 63, 65, 80, 81, 83, 87, 108; 174/17 CT, 31.5

[56] References Cited

U.S. PATENT DOCUMENTS

| | | | |
|---|---|---|---|
| 3,757,031 | 9/1973 | Izraeli | 174/138 F |
| 3,760,811 | 9/1973 | Andrew | 128/351 |
| 3,856,246 | 12/1974 | Sinko | 248/68 CB |
| 3,924,055 | 12/1975 | Moore et al. | 174/40 R |
| 4,108,534 | 8/1978 | LeNoane et al. | 385/134 |
| 4,118,838 | 10/1978 | Schiefer et al. | 24/115 R |
| 4,239,335 | 12/1980 | Stiles | 385/106 |
| 4,395,089 | 7/1983 | McKee | 385/136 |
| 4,445,750 | 5/1984 | Grois et al. | 385/69 |
| 4,447,120 | 5/1984 | Borsuk | 385/136 |
| 4,612,680 | 9/1986 | Daiguji | 14/22 |
| 4,684,196 | 8/1987 | Smith et al. | 439/411 |
| 4,805,979 | 2/1989 | Bossard et al. | 385/135 |
| 5,042,901 | 8/1991 | Merriken et al. | 385/135 |
| 5,155,303 | 10/1992 | Bensel, III et al. | 174/93 |
| 5,237,635 | 8/1993 | Lai | 385/101 |
| 5,509,099 | 4/1996 | Hermsen et al. | 385/134 |

*Primary Examiner*—Rodney B. Bovernick
*Assistant Examiner*—Hemang Sanghavi
*Attorney, Agent, or Firm*—Graham & James LLP

[57] ABSTRACT

The fiber optic cable adapter spool is formed to be retained within an end plate assembly of a wire cable splice closure assembly. The adapter spool provides a cable entrance port capable of supporting an optical fiber cable in conventional telecommunication applications. The fiber optic cable is wrapped with a high coefficient of friction, adhesively-backed tape and a layer of mastic sealant before placed in the cable entrance port. The cable entrance port has two sets of annular gripping teeth and a plurality of annular sealing ribs located between the sets of annular gripping teeth. Once the cable has been placed into a cable entrance port, the adapter spool is contracted to cause the two sets of annular gripping teeth to exert radial pressure into either end of the wrapped portion of the cable. Similarly, during contraction, the layer of mastic sealant around the tape, positioned between the gripping teeth, cooperates with the sealing ribs between the gripping teeth to form a seal between the tape and the cable entrance port. The fiber optic adapter spool therefore restrains the optical fiber cable sheath within the splice closure while providing a seal between the cable and the end plate.

14 Claims, 8 Drawing Sheets

FIBER OPTIC CLOSURE WITH CABLE ADAPTER SPOOL

BACKGROUND OF THE INVENTION

1. Field of the Invention

The present invention relates to telecommunications cable closure assemblies. More particularly, the present invention relates to fiber optic cable closures for enclosing fiber optic cable splices.

2. Description of Related Art

Typically, large diameter telephone distribution cables (e.g., approximately 3" in diameter) may be used to carry hundreds of pairs of electrically conductive wires, such as copper wires, from a central office location to distribution points. Where two ends of such a cable are spliced together, the large cable is cut open, and pairs of wires are spliced together. The splice area is ordinarily housed within a protective cover known as a splice closure. The spliced cable and closure may be suspended in the air from a suspension strand with the total length of cable between suspension poles being 100–200 feet in length. The closure must restrain each end of the cable with an axial force sufficient to overcome the forces created by repeated longitudinal expansion and contraction of the cable due to natural temperature changes. An end of the cable which is not adequately restrained by the closure may simply pull itself out of the closure due to the thermal expansion and contraction of the cable involved. At the same time, the point of entry of the cable into the closure must be hermetically sealed to protect the exposed wires within the closure from the external environment.

Electrically conductive cables are typically restrained within a closure by a heavy duty hose clamp which is secured around the end of the cable, within the closure, and secured to the end plate of the closure with a strain relief bracket. The hose clamp puts a tremendous amount of radial force onto the cable, but holds the large cable securely without interfering with the electrical transmission of the signal. A hermetic seal is formed between the cable and the cable entrance port in the end plate by liberally applying a mastic material to the cable entrance port of the two halves of the end plate and securing the two halves around the cable. As the end plate bolts are tightened, the mastic flows between the cable and the end plate to form a seal which protects the interior of the closure from the external environment.

In recent years, communication via optical fiber cable has enjoyed a rapid rate of growth. Optical fibers provide the ability to transmit large quantities of information by light impulses and thus promise to increase in use in the future. Optical fiber cables are constructed in many configurations, all of which typically include three functional elements, an outer sheath which surrounds the optical fibers, a strength member to withstand cable tension during either placement or when permanently installed, and multiple very fine gauge optical fibers. In most cases the fine gauge optical fibers are organized and given additional protection in buffer tubes within the sheath.

More specifically, the advantages of signal transmission over optical fibers includes increased capacity and the elimination of undesirable interference and cross-talk which may be present with conventional electrically conductive wires. The increased capacity results in fewer optical fibers needed in each cable as compared to typical electrically conductive cables. In addition, each optical fiber is significantly smaller in diameter than an electrically conductive wire. For these reasons, a typical fiber optic cable has a fraction of the diameter of a typical electrically conductive cable.

A disadvantage of the use of optical fibers is that light signals transmitted by optical fiber may be adversely impacted by excessive bending of the optical fiber. Excessive bending can significantly reduce the efficiency of light transmission as it travels along the optical fiber. Therefore, an optical fiber cable must be treated with more deference as compared to electrically conductive cable to prevent excessive radial bending and radial pressure on the optical fibers.

One example of a fiber optic cable splice closure includes multiple fiber optic cable entrance ports in either end of the fiber optic cable closure. The fiber optic cable sheath is restrained within the closure by wrapping the cable sheath with a pressure sensitive adhesive coated rubber tape and securing the wrapped cable with a hose clamp which is in turn secured to a strain relief bracket within the closure. The fiber optic cable strength member is secured within the closure by an anchor. A hermetic seal is provided between the cable and the cable entrance port by wrapping the fiber optic cable with a sealing tape formed of a mastic material and capturing the wrapped cable in the entrance port as the closure is sealed.

The fiber optic closure as described does not provide an adapter to restrain and seal fiber optic cables within a large diameter cable entrance port typically provided with electrically conductive cable closures. In addition, the fiber optic cable restraint system relies solely on a hose clamp and corresponding strain relief bracket for cable sheath retention. As a result, a tremendous amount of radial force is required in order to maintain the fiber optic cable sheath in place as the sheath expands and contracts due to changing temperature conditions. Conversely, if the radial force provided by the hose clamp is not applied to its maximum potential, the sheath could potentially pull out of the hose clamp and the cable entrance port, exposing the optical fibers to the environment and risking disruption of service.

An enormous amount of capital has been invested in the existing telecommunications infrastructure which is designed to accommodate electrically conductive cables. As systems transition to higher capacity, smaller diameter fiber optic cables, it is desirable to adapt the existing infrastructure, including closures, etc., for use with smaller diameter fiber optic cables.

Accordingly, a need presently exists for an improved fiber optic cable splice closure for sealing fiber optic cable splices and effectively restraining the fiber optic cable sheath while effecting a minimum amount of radial force on the optical fibers and which provides a hermetic seal between the optical fiber cable and the cable entrance port. Further, a need presently exists for a means for adapting existing closures designed for use with large diameter electrically conductive cables for use with smaller and more bending sensitive fiber optic cables.

SUMMARY OF THE INVENTION

The present invention provides a system and method for adapting existing closures designed for use with large diameter electrically conductive cables for use with smaller and more bending sensitive fiber optic cables. The present invention provides a system and method for effectively restraining the fiber optic cable sheath while effecting a minimum amount of radial force on the optical fibers within the optical fiber cable sheath. The present invention further provides a system and method for sealing fiber optic cable splices which provides a hermetic seal between the optical fiber cable and the cable entrance port. The present invention further provides a system and method for anchoring a strength member and restraining an optical fiber cable.

In a preferred embodiment, the adapter spool of the present invention is formed to fit within an end plate assembly of a typical wire cable splice closure assembly. The adapter spool provides a cable entrance port capable of supporting an optical fiber cable in conventional telecommunication applications.

The cable is prepared before placing the cable in the adapter spool. The cable is wrapped with several windings of a high coefficient of friction, partially adhesively-backed tape. The adhesive provides a seal between the layers of tape as well as the tape and the optical fiber cable sheath. A central strip around the outer layer of the tape is then wrapped with a layer of mastic sealant. The prepared cable is placed into the adapter in a cable entrance port. Cables are prepared prior to assembling the adapter. Vacant cable entrance ports are sealed with a plug.

The adapter spool, when assembled, forms a circular disk having an annular cable entrance port and a sealing channel. The cable entrance port has two sets of annular gripping teeth and a plurality of annular sealing ribs located between the sets of annular gripping teeth. Mastic communication ports are also provided to permit mastic sealant to flow between the sealing ribs of neighboring cable entrance ports, when more than one cable entrance port is provided. Mastic communication ports are also provided between the sealing ribs of the cable entrance port and the circumferential sealing channel.

Once the cable has been placed into a cable entrance port, the adapter spool is contracted to cause the two sets of annular gripping teeth to exert radial pressure into either end of the tape wrapped portion of the cable. Similarly, during contraction, the layer of mastic sealant around the tape, positioned between the gripping teeth, cooperates with the sealing ribs between the gripping teeth to form a seal between the tape and the cable entrance port and force mastic sealant into the mastic communication ports.

The end plate assembly is a disk-shaped structure having two semi-circular halves, each having a semi-circular cut-out which provides a cable entrance port and an annular sealing channel. When the adapter spool is secured in the end plate, the force between the adapter spool sealing channel and the end plate sealing channel causes mastic sealant to cooperate and provide a seal between the end plate and the adapter spool and to flow into the mastic communication ports. Therefore, a substantially continuous seal is provided between the end plate and the cable.

The present invention also provides a splice closure assembly for an optical fiber cable splice including an anchoring bracket secured to the end plate. The anchoring bracket is integrally formed and provides an anchor for a fiber optic cable strength member. In addition, the same bracket may be used to restrain the optical fiber cable sheath relative to the anchor bracket. The additional restraint is provided by securing the cable sheath to the anchoring bracket with a hose clamp. Therefore, the strength member and the optical fiber cable sheath may be retained using a single anchor bracket.

The method of the present invention adapts a splice closure having an end plate assembly to a cable having a smaller diameter using an adapter spool having a cable entrance port. In this method the cable is wrapped with tape having a high coefficient of friction and a narrow strip of adhesive applied to one side. The cable is wrapped until the cable is equivalent in diameter to the cable entrance port of the adapter spool. The wrapped cable is placed into the cable entrance port of the adapter spool and the adapter spool is contracted to exert radial force on the tape thereby restraining the cable within the cable entrance port. The adapter spool is secured within the end plate of the closure assembly and the end plate assembly is secured within a closure cover.

A more complete understanding of the fiber optic adapter spool of the present invention will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Figure 1:
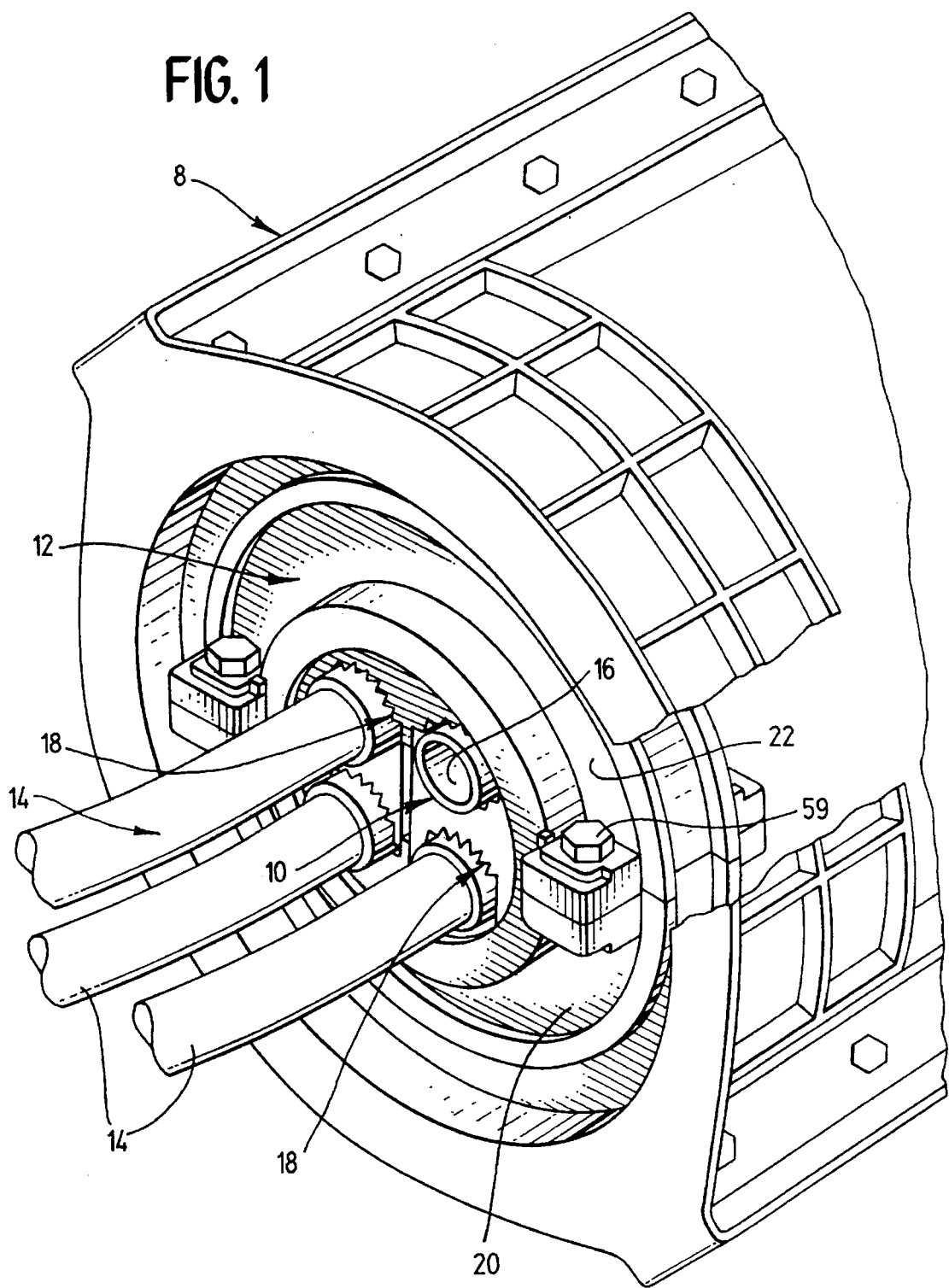
FIG. 1 is a perspective view of a preferred embodiment of the improved fiber optic cable adapter spool of the present invention as secured in an end plate of a closure.

A detailed description of the present invention will now be presented in conjunction with the embodiment of the present invention illustrated in FIGS. 1–11, wherein like reference numbers refer to like elements. While the embodiment illustrated in FIGS. 1–11 is a preferred embodiment, it is to be understood that the present invention is in no way limited to the embodiment shown in the drawings.

Figure 2:
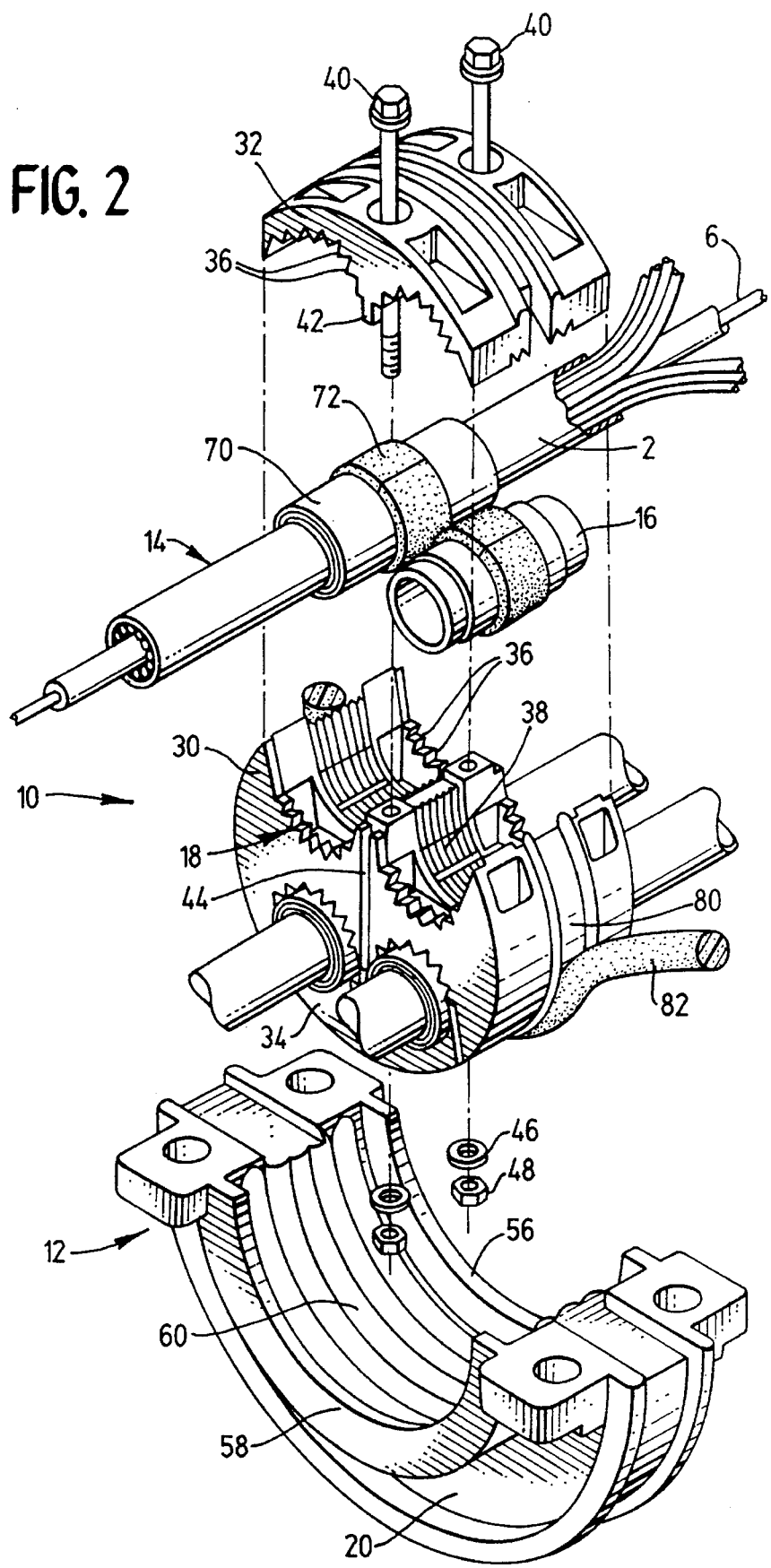
FIG. 2 is an exploded view of the primary components of the fiber optic cable adapter spool of the present invention and the bottom half of an end plate.

The adapter spool 10 of the present invention as shown in FIGS. 1 and 2 is formed to fit within an end plate assembly 12 of a typical wire cable splice closure assembly 8. The adapter spool 10 may be formed of any suitable hard plastic having the same properties as typically used in forming closures. The adapter spool 10 provides one or more cable entrance ports 18 each capable of supporting an optical fiber cable 14, typically ¾" in diameter, in conventional telecommunication applications. In a presently preferred embodiment, four ports 18 may be employed. Other applications may require an adapter spool 10 for supporting optical fiber cables 14 of a smaller size. In such applications, the adapter spool 10 would include additional cable entrance ports 18, each of a smaller diameter consistent with the reduced size of the optical fiber cable. Alternatively, other applications may require an adapter spool 10 for supporting optical fiber cables of a larger size. In such applications, the adapter spool 10 would include fewer cable entrance ports 18 each of a larger diameter consistent with the increased size of the larger diameter optical fiber cable.

In yet other applications, the adapter spool 10 may be needed in applications having a larger diameter cable entrance port 18 in the existing end plate assembly 12. In such applications, the adapter spool may be increased in size to accommodate the larger diameter and provide the required cable entrance ports.

The fiber optic cable adapter spool, although optimized for restraining and securing optical fiber cables in existing electrically conductive cable closures, may also support existing electrically conductive cables where required. In such applications each cable may include a hybrid of electrically conductive wires and optical fibers. The adapter spool may also support a mix of electrically conductive cables and optical fiber cables as the need exists.

In a preferred embodiment, the adapter spool as shown in FIGS. 1 and 2 restrains and seals four ¾" optical fiber cables 14 in a 3" cable entrance port in a conventional end plate assembly 12. If fewer than 4 cables are required, a plug 16 is provided to seal any vacant adapter cable entrance ports 18.

An exploded view of the primary components of the fiber optic adapter spool of the present invention and an associated end plate portion 20 are shown in FIG. 2. The adapter spool 10 includes a central portion 30, a top portion 32 and a bottom portion 34, which, when assembled, form a circular disk. The top portion 32 and the bottom portion 34 are identical in construction. Each of the three portions have a plurality of annular gripping teeth 36 and annular sealing ribs 38.

The gripping teeth 36 are provided as a flange which extends toward the center of each cable entrance port 18 and are displaced in an arcuate configuration at the front and back ends of the central portion 30, top portion, 32 and bottom portion 34 of the adapter spool 10. The length of the gripping teeth 36 is determined such that when the adapter spool is assembled around an optical fiber cable 14, the gripping teeth 36 extend centrally to bite into and restrain the prepared cable 14 as will be described further below.

The sealing ribs 38 are provided between the gripping teeth 36 along a middle, interior portion of each of the central portion 30, top portion 32, and bottom portion 34 of the adapter spool 10. The peaks of the sealing ribs 38 are recessed below the height of the surface of the cable entrance ports 18 to form a mild trough. The valleys between the sealing ribs are recessed further to provide a slightly wider diameter as compared to the inner surface of the cable entrance port and the trough defined by the peaks of the sealing ribs 38. The sealing ribs 38 are aligned perpendicular to the cable 14 in the cable entrance port 18 of the adapter spool 10. The sealing ribs 38 do not extend laterally as far as the gripping teeth 36. A gap is provided between the sealing ribs 38 and the gripping teeth 36 to ensure no sealing material interferes with the function of the gripping teeth 38.

Figure 3:
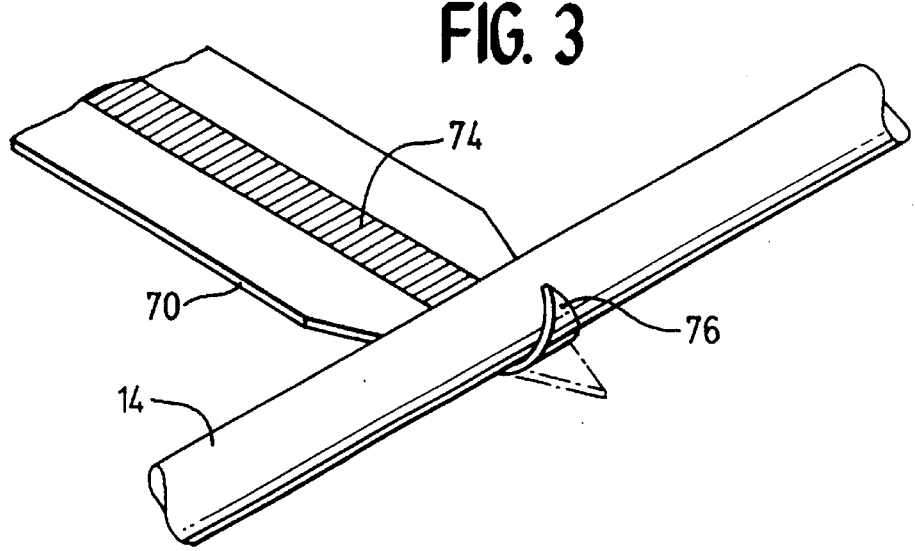
FIG. 3 is a perspective view which illustrates preparing a fiber optic cable with rubber-like tape prior to securing the prepared cable within the fiber optic cable adapter spool of the present invention.

As shown in FIG. 3, the cable 14 or plug 16 must be prepared before placed into and secured by the adapter spool 10. The end of the optical fiber cable 14 to be secured within the adapter spool 10 is wrapped with a continuous length of thin, adhesively-backed rubber-like tape 70. The tape is formed of a rubber-like material such as neoprene or similar such material having the same qualities of flexibility, high coefficient of friction and resistance to harsh environmental conditions. The high coefficient of friction of the neoprene tape with itself ensures that the fiber optic cable sheath, wrapped in several layers of neoprene tape 70, will not pull out of the cable entrance port of the adapter spool, nor will the neoprene tape telescope, under expected axial loading conditions.

A thin layer of adhesive coating 74 is provided to seal each layer of tape against the previous layer of tape or the cable as in the case of the first layer of neoprene tape. The adhesive also assists the operator in wrapping the optical fiber cable by allowing the operator to start wrapping in a precise location on the optical fiber cable. The adhesive coating 74 is preferably limited to one side of the neoprene tape 70 and is minimally applied to a narrow central portion of the neoprene tape to seal each layer of tape. A minimal amount of adhesive is used to maximize the resistance provided by the tape-on-tape friction.

The neoprene tape 70 should be at least as wide as the adapter spool 10 in order to ensure the gripping teeth 36 may grip either side of the neoprene tape 70 as will be discussed further below. Preferably the neoprene tape 70 is slightly wider than the width of the adapter spool 10.

As shown in FIG. 3, the end of the neoprene tape 70 to first be applied to the optical fiber cable 14 is cut into an elongated "v" or point 76. This method of applying the neoprene tape 70 to the cable 14 minimizes the possibility of moisture or other harmful elements entering the closure through the interface between the neoprene tape 70 and the optical fiber cable 14.

Figure 4:
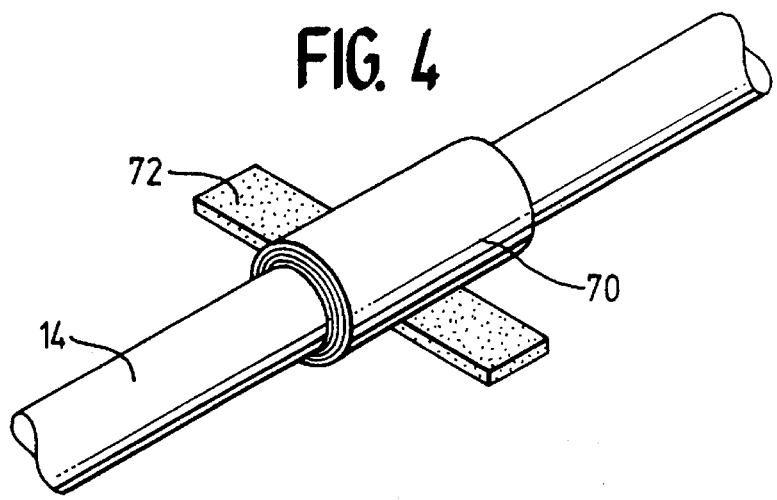
FIG. 4 is a perspective view illustrating preparing the wrapped fiber optic cable with sealing compound prior to securing the prepared cable within the fiber optic cable adapter spool of the present invention.

As shown in FIG. 4, once the point of the neoprene tape 70 is applied to the sheath of the optical fiber cable 14, the neoprene tape 70 is wound around the optical fiber cable 14 until the diameter of the combination of cable and tape has been built up to fit securely within a cable entrance port 18 of the adapter spool 10. A cable gauge may be provided (not shown) which corresponds to a cable entrance port 18 diameter. The gauge may be applied by the cable preparer to the neoprene tape wrapped cable in order to determine when the diameter of the neoprene tape wrapped cable has been extended sufficiently to fit snugly within an adapter cable entrance port. This method permits optical fiber cables of varying sizes to be secured within a single size adapter cable entrance port 18. In practice, therefore, a smaller diameter optical fiber cable may be wrapped with additional neoprene tape until the diameter of the wrapped cable reaches the desired diameter as indicated by the cable gauge. Similarly, a larger diameter cable may be wrapped to a lesser extent to reach the desired diameter.

Figure 5:
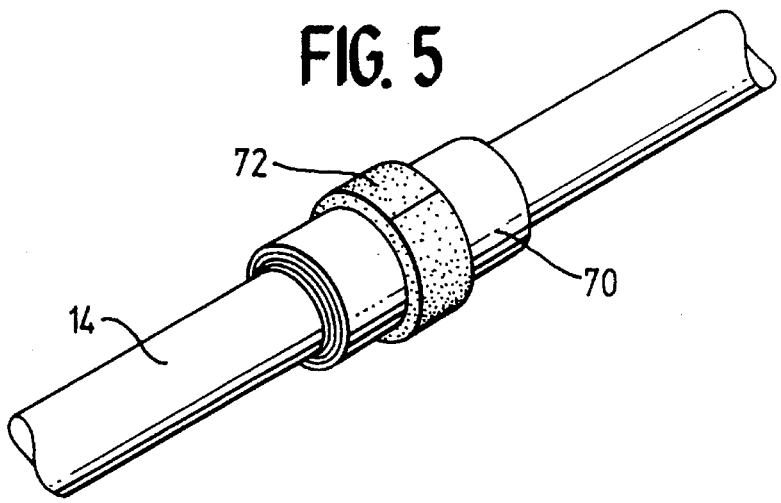
FIG. 5 is a perspective view illustrating the prepared fiber optic cable.

Still referring to FIG. 4, a thin layer of sealing material such as mastic 72 is applied over the outer layer of neoprene tape 70 of the wrapped cable 14. The mastic 72 is of generally the same width as the trough provided by the sealing ribs 38 (shown in FIG. 2) of the adapter spool 10. The mastic 72 is a flexible sealant which provides a moisture seal and is resistant to harmful environmental elements such as hydrocarbons, fungus and fire. The mastic 72 is sticky, or tacky, but is pliable such that it will flow when pressure is applied. The final prepared cable 14 as shown in FIG. 5 is wrapped with multiple layers of neoprene tape 70 and a single layer of mastic material 72. Additional layers of mastic 72 may be applied if the initial amount does not provide an adequate seal.

A cable plug 16 is typically not wrapped with neoprene tape 70 in preparation for installation in an adapter cable entrance port 18. The cable plug diameter is consistent with the diameter of the cable entrance port 18 and requires only a layer of mastic 72 for proper sealing.

Alternately, under conditions where a hermetic seal is not required, the neoprene tape may be applied without the adhesive. This embodiment permits maximum tape-on-tape friction, thus generating greater friction and consequently greater resistance to axial loads.

As shown in FIG. 2, after each cable 14 or plug 16 has been properly prepared with neoprene tape 70 and mastic 72, the cable 14 or plug 16 is placed into the adapter spool 10 between the central portion 30 and either the top portion 32 or the bottom portion 34, as desired by the user.

Figure 9:
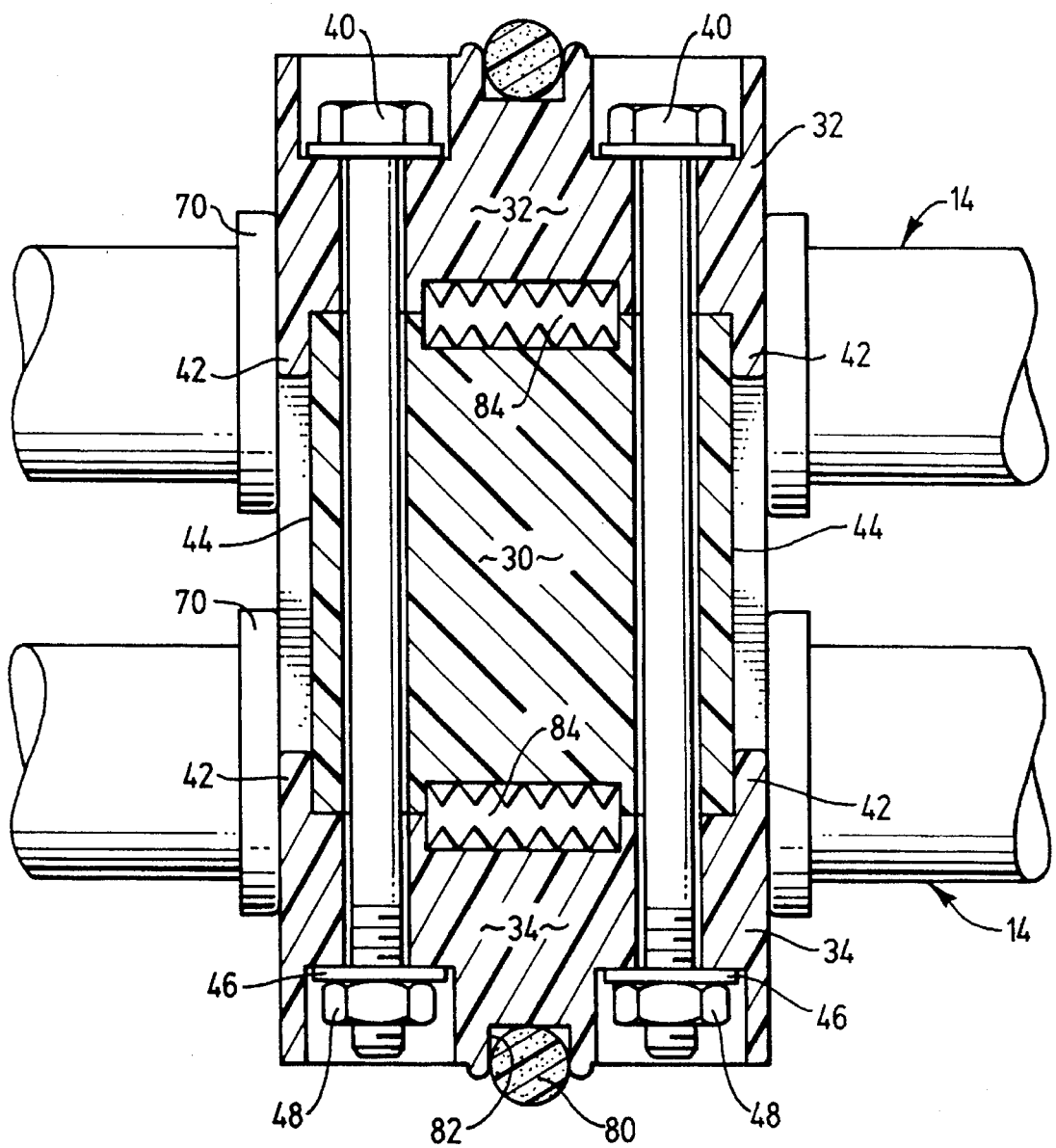
FIG. 9 is a side view taken along line 9—9 of FIG. 6 showing a cross-section of a preferred embodiment of the improved fiber optic cable adapter spool of the present invention.

As best shown in FIG. 9, the top portion 32 and the bottom portion 34 are secured to the central portion 30 using a pair of bolts 40 which are secured by using washers 46 and nuts 48. To assist alignment, top portion 32 and bottom portion 34 are provided with guides 42 which extend towards the center of the adapter spool 10. Central portion 30 is provided with guide slots 44 formed on the front and back surface of the central portion 30. Once the guides 42 and guide slots 44 have been aligned between the central portion 30, the top portion 32 and the bottom portion 34, the bolts 40 may be tightened using washer 46 and nut 48 to secure the prepared optical fiber cables 14 within the adapter cable entrance ports 18 of the adapter spool 10. Alternatively, the top and bottom portions of the adapter spool may be secured separately to the central portion by means of screws which tap into the plastic of the central portion.

Figure 6:
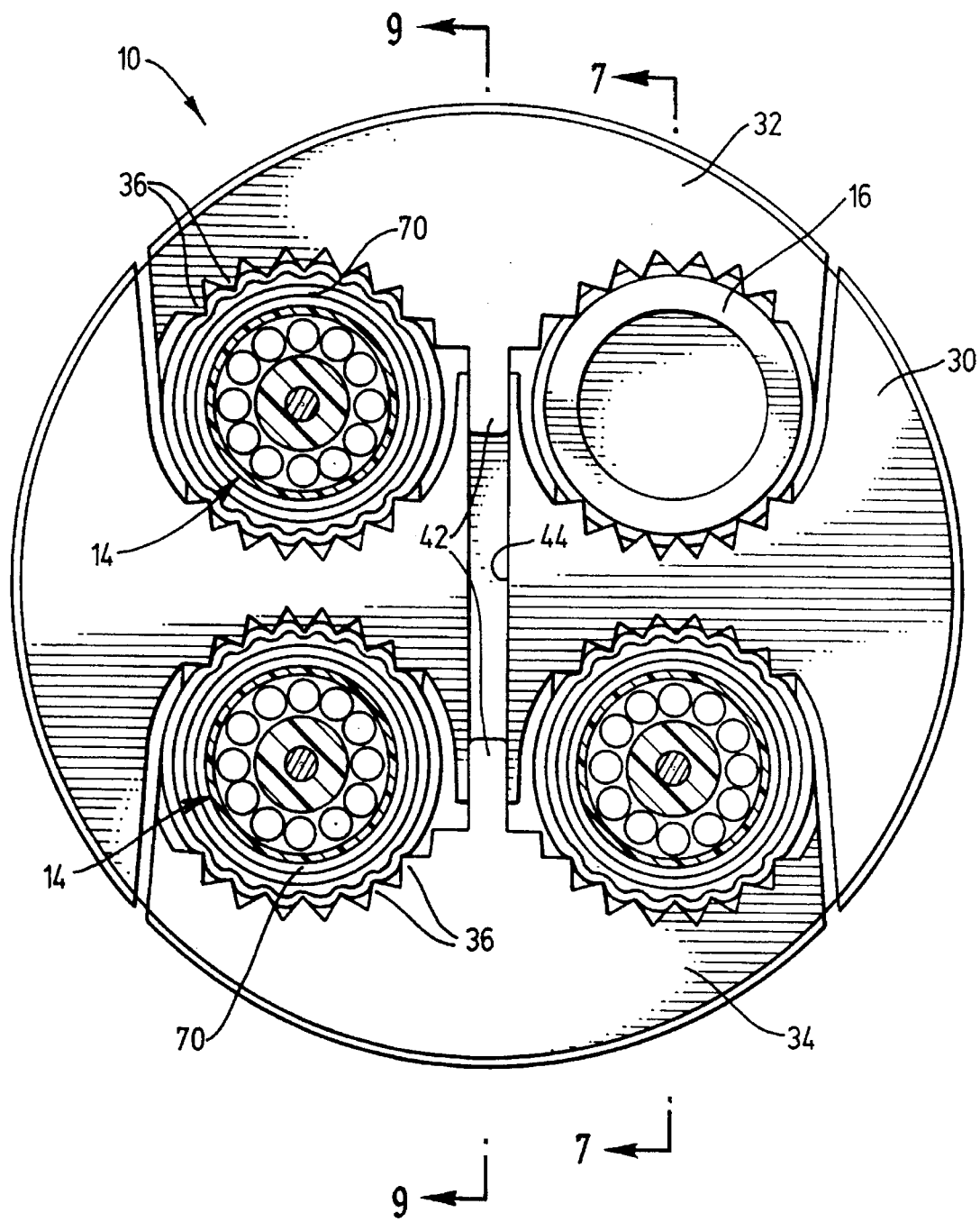
FIG. 6 is a top plan view of a preferred embodiment of the improved fiber optic cable adapter spool of the present invention.

As shown in FIG. 6, once the adapter spool 10 is assembled, the gripping teeth 36 come into contact with the neoprene tape 70 wrapped around the optical fiber cable 14. As the bolts are tightened further, a radial force builds between the gripping teeth 36 and the neoprene tape 70 and the adapter spool 10 assumes a disk shape.

Figure 7:
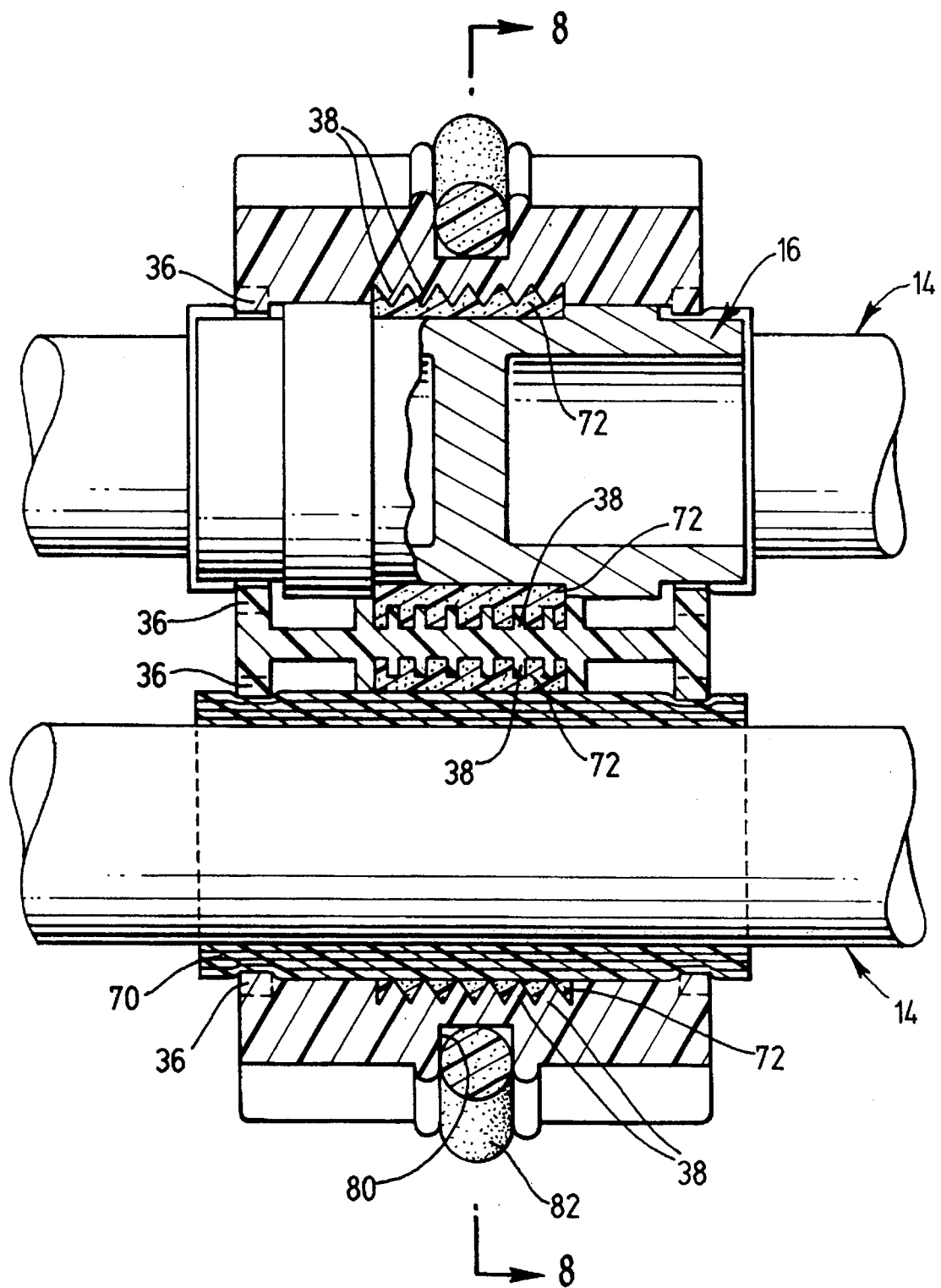
FIG. 7 is a side view taken along line 7—7 of FIG. 6 showing a cross-section of a preferred embodiment of the improved fiber optic cable adapter spool of the present invention.

As shown in FIG. 7, more specifically, radial force is generated between the gripping teeth 36 at the front of the adapter spool and the gripping teeth 36 at the back of the adapter spool, and the neoprene tape 70. The combination of neoprene tape 70 and two sets of gripping teeth 36, one on the front of the adapter spool and one on the back of the adapter spool is capable of maintaining the cable sheath in place in the face of considerable axial pull forces.

As shown in FIG. 7, the gripping teeth 36 are provided in the front and back of the adapter spool 10. The gripping teeth 36 therefore spread the radial force on the cable 14, reducing the radial force at any single point in the cable. The reduced radial force helps prevent microbending which can interfere with or reduce the efficiency of light transmission in an optical fiber cable. Radial force is further spread by the neoprene tape. The neoprene tape generates a prepared cable of a significantly larger diameter than the original cable. The greater diameter permits the force generated on any single point of the cable to be spread over a greater distance. In addition, the additional neoprene material protects the cable sheath from possible tears or punctures which could otherwise result from gripping teeth biting into a cable sheath.

The optical fiber cable sheath is maintained within the adapter cable entrance port 18 against axial pull force by the two sets of gripping teeth 36 which are firmly set into the neoprene tape 70. The high coefficient of friction of the neoprene tape 70 in combination with the adhesive backing 74 (as shown in FIG. 3) prevents the neoprene tape 70 from telescoping when axial force is applied to the optical fiber cable sheath. For the same reasons, the optical fiber cable sheath resists pulling out from the neoprene tape 70.

Still referring to FIG. 7, once the adapter spool 10 is assembled, the peaks of the sealing ribs 38 come into contact with the mastic 72 wrapped around the central portion of the neoprene tape 70 which is wrapped around the cable 14. As the bolts are tightened further, a radial force builds between the peaks of the sealing ribs 38 located in the central portion 30, the top portion 32 and the bottom portion 34 of the adapter spool 10 and the mastic 72. Under this force, the mastic 72 flows laterally over the peaks of the sealing ribs 38 to fill the area formed between the individual sealing ribs 38 and the neoprene wrapped cable 14. The excess mastic 72 may flow into the mastic communication ports 84 (as shown in FIGS. 8 and 9 and discussed further below).

Also shown in FIG. 7 is the adapter spool sealing channel 80 which is provided circumferentially around the central portion 30, the top portion 32 and the bottom portion 34 of the adapter spool 10. Once the adapter spool 10 is assembled, the adapter spool sealing channel 80 provides a channel around the circumference of the adapter spool 10 which is periodically interrupted by a mastic communication port 84. A mastic rope 82 formed substantially of the same material as the mastic 72 described in accordance with FIGS. 4 and 5 above, is placed in the sealing channel so as to fill the sealing channel 80 and cover the mastic communication port 84.

Figure 8:
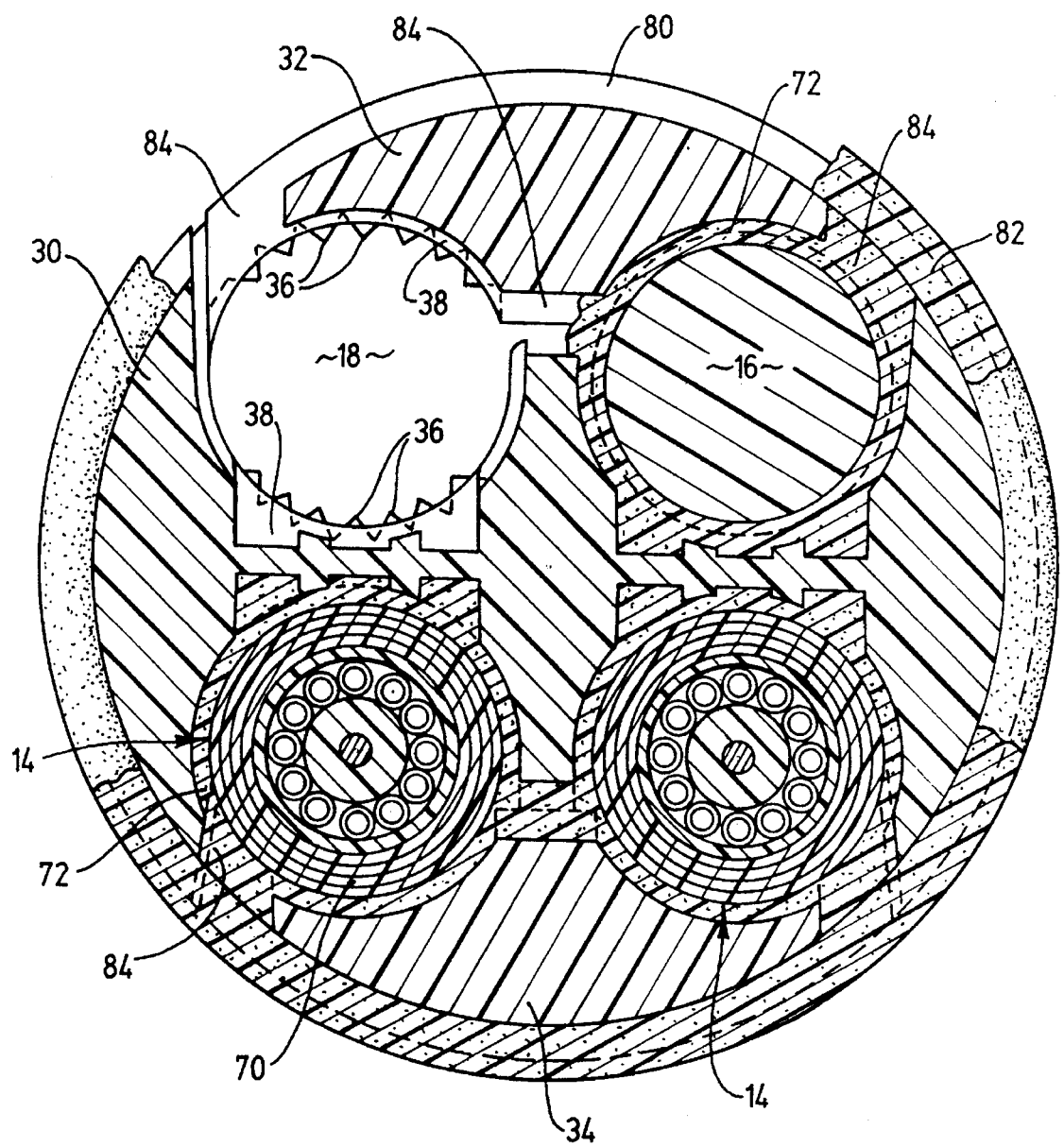
FIG. 8 is a top view taken along line 8—8 of FIG. 7 showing a cross-section of a preferred embodiment of the improved fiber optic cable adapter spool of the present invention.

FIG. 8 is a top view taken along line 8—8 of FIG. 7 which shows the interaction between the mastic 72 and the mastic rope 82 once the adapter spool has been assembled around an optical fiber cable 14 or a plug 16. As shown in FIGS. 8 and 9, the assembled adapter spool includes mastic communication ports 84 which are formed by gaps between the central portion 30, and the top portion 32 and the bottom portion 34 of the adapter spool 10 in the assembled adapter spool 10. These mastic communication ports 84 are provided to permit mastic 72 and mastic rope 82 to flow together to form a hermetic seal throughout the adapter spool 10.

As best shown in FIG. 8, a portion of the mastic 72 may also flow into the various mastic communication ports 84 to fill the interstitial space between the cable entrance ports 18 and fill the interstitial space between the cable entrance ports 18 and the adapter spool sealing channel 80 as further described below.

The end plate assembly 12 (as shown in FIGS. 1 and 2) is formed from two semicircular end plate portions 20 and 22 which, when assembled in a disk, include a central circular cut-out which serves as a cable entrance port for a large diameter electrically conductive cable. The end plate portions 20 and 22 each include an inner flange 56, an outer flange 58 and an end plate sealing channel 60. The inner flange 56 and the outer flange 58 serve to retain the front and back of the adapter spool 10 when the end plate portions 20 and 22 are bolted together by end plate bolts 59.

As shown in FIG. 8, as the end plate portions 20 and 22 are bolted together around the assembled adapter spool 10, capturing the adapter spool 10, the end plate sealing channel 60 comes into contact with the mastic rope 82 in the adapter spool sealing channel 80. As the end plate bolts are tightened pressure is generated on the mastic rope 82 by the force of the end plate sealing channel 60 and the adapter spool sealing channel 80. The mastic rope 82 flows to fill the area between the end plate sealing channel 60 and the adapter spool sealing channel 80.

As further shown in FIG. 8, the mastic rope 82 may also flow into the mastic communication ports 84 between each cable entrance port and the adapter spool sealing channel 80. Therefore, as a result of assembling the prepared cables within the adapter spool 10 and assembling the adapter spool within the end plate assembly 12, the mastic communication ports 84 permit fluid communication between the mastic 72 surrounding the prepared cables in the cable entrance ports and the mastic rope 82 in the adapter spool sealing channel 80. This continuous flow of mastic material provides a hermetic seal which protects the interior of the closure from the harmful elements of the external environment.

As shown in FIG. 1, the end plate assembly 12, with adapter spool 10 and optical fiber cables 14 installed, is installed into one end of the splice closure 8.

In an alternate embodiment, a cable 14, may be prepared as described above in relation to FIGS. 3–5 and installed directly into the cable entrance port of end plate assembly 12 of the splice closure 8. In such applications, the cable 14 is wrapped with a neoprene tape 70, as described in accordance with FIGS. 3 and 4 until the diameter of the wrapped cable 14 is substantially equivalent to the diameter of the cable entrance port of the end plate assembly 12. A layer of mastic sealant 72 is applied over the outer layer of neoprene tape 70 of the wrapped cable 14, as described in accordance with FIGS. 4 and 5. The neoprene tape should be at least as wide as the distance between the end plate inner flange 56 and outer flange 58. The mastic 72 is of generally the same width as the end plate sealing channel 60 (as shown in FIG. 2).

Functionally, a cable of a smaller diameter may be retained and sealed within a cable entrance port in an end plate having a larger diameter by wrapping the cable with a neoprene tape having a high coefficient of friction, and a narrow strip of adhesive backing, until the diameter of the neoprene tape is substantially equivalent to the diameter of the cable entrance port. A layer of mastic sealant is applied to a narrow strip around the center of the neoprene tape, and the prepared cable is placed in the end plate assembly 12. A hermetic seal is formed between the wrapped cable and the cable entrance port in the end plate assembly by liberally applying a mastic material to the cable entrance port of the two halves of the end plate and securing the two halves around the cable. As the end plate bolts are tightened, the mastic flows between the wrapped cable and the end plate to form a seal which protects the interior of the closure from the external environment. At the same time, the wrapped cable is restrained within the cable entrance port of the end plate by radial pressure on the neoprene tape 72 from both the inner flange 56 and the outer flange 58.

Figure 10:
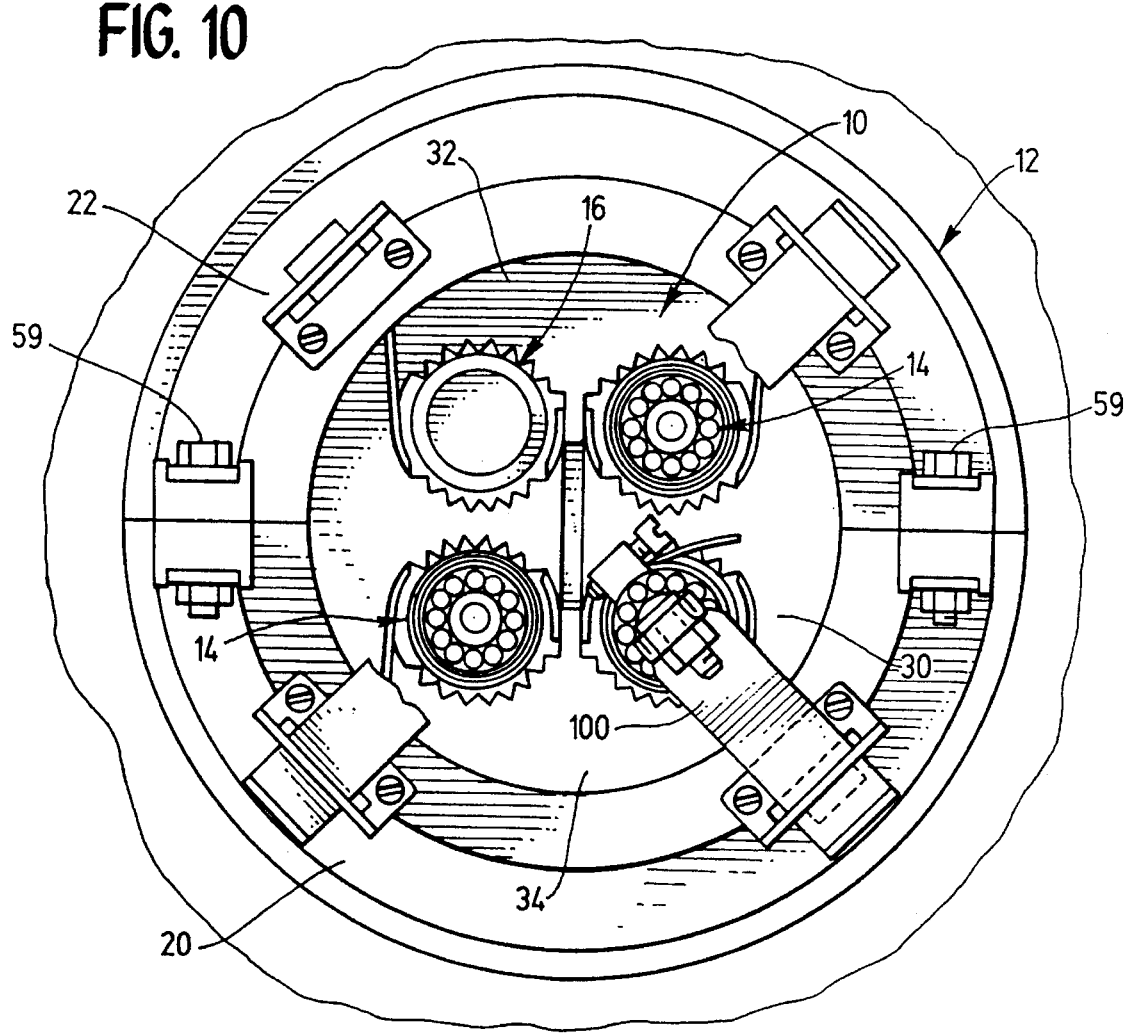
FIG. 10 is a plan view of a preferred embodiment of the improved fiber optic cable adapter spool of the present invention, as shown from within the interior of a closure, showing the strain relief bracket, the hose clamp and the end plate.
Figure 11:
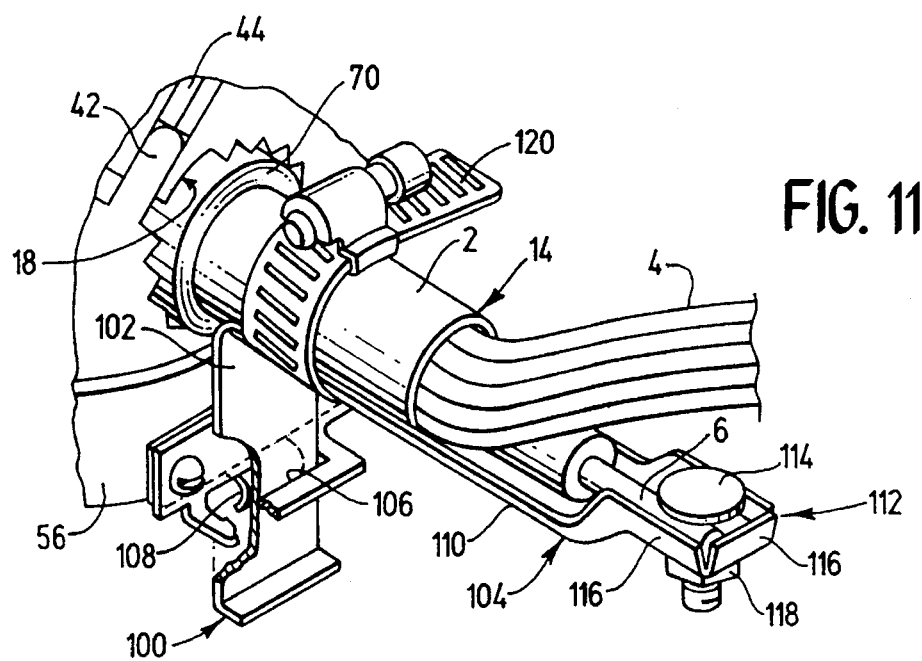
FIG. 11 is a perspective view of the detail of the strain relief bracket, the hose clamp and the end plate.

As shown in FIG. 10, the end plate assembly 12 includes one or more anchoring brackets 100. The number of anchoring brackets 100 corresponds directly to the number of optical fiber cables 14 installed in the adapter spool 10. As shown in FIG. 11, each anchoring bracket is integrally formed from a high strength metal such as steel and formed in a right angle providing a bracing member 102 and a cantilevered member 104. The bracing member 102 is generally flat and shorter than the cantilevered member 104. The bracing member may be secured to the inner flange 56 of the end plate assembly 12 via bracing slot 106. Bracing slot 106 is spring loaded by spring member 108 which is disposed between bracing slot 106 and the inner flange 56. The spring member 108 may be formed from spring steel or similar material having a memory which causes the spring member 108 to return to its original form. The bracing slot 106 and spring member 108 are secured to the inner flange 56 of the end plate assembly with conventional means such as screws. When the bracing member 102 is guided into bracing slot 106 the bracing member is maintained parallel to the inner flange 56 by the spring member 108 by the constant pressure generated by the spring member 108. This same force maintains the cantilevered member 104 in a position parallel to an incoming cable 14 provided through cable entrance port 18.

The cantilevered member 104 projects in a laterally arcuate, concave portion 110 away from the end plate assembly 12 towards the center of the closure as maintained by the bracing member 106. The arcuate shape is form-fitting to a cable 14 entering through the cable entrance port 18.

The cantilevered member 104 concludes in a narrow anchoring platform 112 which is surrounded by raised perpendicular walls 116 on all sides except the side facing the cable entrance port 18. The anchoring platform provides a hole for an anchor bolt 114, formed with a generally flat topped inverted cone shaped head. Under the cone shaped head the anchor bolt is provided with four lateral surfaces which are generally parallel to the raised perpendicular walls 116 on the anchoring platform 112.

In view of the foregoing structural description of the anchoring bracket of the present invention, its functional features may be readily appreciated in consideration with FIGS. 10 and 11.

As shown in FIG. 11, the bracing member 102 is secured to the inner flange 56 of the end plate assembly 12 and maintained in place with spring member 108. The cantilevered member 104 extends perpendicularly from the end plate assembly 12. The optical fiber cable 14 is secured within a cable entrance port 18 of the adapter spool 10 which is, in turn, secured within the end plate assembly 12.

In making a splice into a fiber optic cable 14 the cable is secured within the closure assembly 8. Suitable additional slack cable is provided and the optical fiber cable sheath 2 is cut and separated from the optical fibers 4. The optical fibers 4 are looped and laid within the base of the closure 8. The strength member 6 is then severed to provide a length thereof which is sufficient to extend from the end of the optical fiber cable sheath 2 to the anchoring platform 112 formed to receive the strength member 6 and hold the strength member 6 in fixed position against axial displacement.

The strength member 6 of the optical fiber cable 14 anchored by securing the strength member 6 to the anchoring platform 112 on the anchoring bracket 100. The central portion of the strength member 6 is captured between the cone shaped head of the anchor bolt 114, one of the lateral walls of the anchor bolt 114 directly under the cone shaped head, a parallel raised perpendicular wall 116 on the anchoring platform 112 and the anchoring platform 112. The anchor bolt 114 is tightened by turning fastener 118 which forces or drives the cone shaped head of the anchor bolt 114 into contact with the strength member 6 along a length thereof and into contact with the anchoring platform 112 to bind the strength member and restrict the axial movement thereof. The arcuate form of the cantilevered member 104 provides the anchoring bracket 100 with additional strength to resist bending under severe axial loads.

Still referring to FIG. 11, retention of the optical fiber cable sheath 2 may be enhanced over and above the optical fiber cable sheath 2 retention provided by the adapter spool 10 by providing hose clamp 120 which encircles both the optical fiber cable 14 and the cantilevered member 104 portion of the anchoring bracket 100. The hose clamp 120 is tightened around the optical fiber cable 14 and the cantilevered member 104 until sufficient radial force is applied to the optical fiber cable sheath 2 to assist in preventing cable sheath pull-out due to axial loads on the optical fiber cable sheath 2 generated by changing external temperature, for example. The adapter spool provides adequate cable sheath retention in and of itself. However, providing additional cable sheath retention through the addition of a hose clamp 120 ensures cable sheath retention for little additional cost. In addition, because the adapter spool 10 provides adequate retention of the cable sheath 2, the hose clamp 120 is not required to be closed as tightly, therefore limiting undue radial force on the optical fibers within the optical fiber cable 14. Instead, additional cable sheath retention is provided with minimal risk of interfering with efficient optical signal transmission.

Accordingly, it will be appreciated that the adapter spool of the present invention provides an improved fiber optic cable splice closure for sealing fiber optic cable splices and effectively restraining the fiber optic cable sheath while effecting a minimum amount of radial force on the optical fibers and which provides a hermetic seal between the optical fiber cable and the cable entrance port. Furthermore, the adapter spool of the present invention provides an adapter to permit existing closures designed for use with large diameter electrically conductive cables to be used with smaller and more bending sensitive fiber optic cables.

The present invention also provides an integrally formed bracket which serves to both anchor the optical fiber cable strength member and provide additional strain relief on the optical fiber cable sheath to prevent cable sheath pull-out in an inexpensive and easy to install system.

While the foregoing description has been of a presently preferred embodiment of the present invention, it should be appreciated that the adapter spool of the present invention may be modified in a wide variety of ways while still remaining within the spirit and scope of the present invention. For example, the specific configuration of the adapter spool cable entrance openings, the gripping teeth, the sealing ribs and the sealing channel may all be varied due to specific manufacturing considerations or other reasons without departing from the spirit and scope of the present invention. Furthermore, while the present invention has been described as a adapter spool for a fiber optic cable, the adapter spool is suitable for adapting any type of cable, including electrically conductive cable, to be restrained and sealed within a smaller diameter cable entrance port.

Additional variations and modifications of the preferred embodiment described above may also be made as will be appreciated by those skilled in the art and accordingly the above description of the present invention is only illustrative in nature. The invention is further defined by the following claims.

What is claimed is:

1. A splice closure assembly adapted for enclosing an optical fiber cable splice, which cable includes an optical fiber cable sheath and a plurality of optical fibers, the splice closure assembly comprising:

an end plate assembly having an opening of a first diameter therein;

a cover attached to said end plate;

an adapter spool secured within said opening in said end plate assembly, said adapter spool having an outer diameter matching said first diameter and having a cable entrance port having a second diameter for receiving the optical fiber cable therein;

said adapter spool further comprising:
means for contracting said outer diameter of said adapter spool to secure the optical fiber cable within said cable entrance port;
means for restraining the optical fiber cable sheath within the closure by applying radial force to the cable within said cable entrance port; and
means for distributing said radial force to the optical fiber cable.

2. A splice closure assembly according to claim 1, further comprising means for providing a seal between said optical fiber cable, said adapter spool and said end plate assembly, said means for providing a seal integrally formed within said adapter spool.

3. A splice closure assembly according to claim 2, wherein said means for providing a seal further comprises a plurality of arcuate sealing ribs provided along an interior portion of said cable entrance port and integrally formed with said cable entrance port, wherein a mastic sealant material is wrapped around the optical fiber cable and cooperates with said sealing ribs for forming a seal between the optical fiber cable and said cable entrance port.

4. A splice closure assembly according to claim 2, wherein said end plate assembly comprises an end plate sealing channel and wherein said means for providing a seal comprises an adapter spool sealing channel around a circumference of said adapter spool, wherein a mastic sealant material is set within said adapter spool sealing channel and cooperates with said end plate sealing channel for forming a seal between said adapter spool and said end plate assembly.

5. A splice closure assembly according to claim 2, wherein said means for sealing further comprises a mastic sealant material communication port for forming a substantially continuous seal between said end plate assembly and the optical fiber cable.

6. A splice closure assembly according to claim 1, wherein said means for distributing said radial force comprises a high coefficient of friction tape which is as wide as said means for restraining said optical fiber cable sheath, said tape having a strip of adhesive applied longitudinally along a central portion of one side of said tape for facilitating cable wrapping and for providing a seal between succeeding layers of said tape, wherein said tape is wrapped around the optical fiber cable until the diameter of said wrapped cable is equivalent to said second diameter.

7. A splice closure assembly according to claim 1, wherein said means for restraining comprises a plurality of gripping teeth provided as an annular flange which extends toward the center of said cable entrance port, wherein said gripping teeth are integrally formed with said adapter spool and are displaced in an arcuate configuration for retaining said means for distributing said radial force to the optical fiber cable when said means for contracting is actuated, thus retaining the fiber optic cable sheath against axial loads.

8. A splice closure assembly according to claim 7, wherein said means for restraining further comprises at least two said annular flanges.

9. A splice closure assembly according to claim 8, wherein two of said annular flanges are proximate a front end and a back end of said adapter spool.

10. An adapter spool assembly for adapting an optical fiber cable for use with a closure having an end plate assembly having an opening of a first diameter, which cable includes an optical fiber cable sheath and a plurality of optical fibers, the adapter spool assembly comprising:

a body portion having an outer diameter matching said first diameter and having a cable entrance port having a second diameter for receiving the optical fiber cable;

means for contracting the outer diameter of the body portion to secure the optical fiber cable within said cable entrance port;

means for restraining the optical fiber cable sheath within the closure by applying radial force to the optical fiber cable within said cable entrance port; and means for distributing said radial force to the optical fiber cable.

11. A splice closure assembly according to claim 10, wherein said means for restraining comprises a plurality of gripping teeth provided as an annular flange which extends toward the center of said cable entrance port, wherein said gripping teeth are integrally formed with said adapter spool and are displaced in an arcuate configuration for retaining said means for distributing said radial force to the optical fiber cable when said means for contracting is actuated, thus retaining the fiber optic cable sheath against axial loads.

12. A splice closure assembly according to claim 11, wherein said means for restraining further comprises at least two said annular flanges.

13. A splice closure assembly according to claim 12, wherein two of said annular flanges are proximate a front end and a back end of said adapter spool.

14. A method for adapting a cable to a splice closure having an end plate assembly with a cable entrance port of a first diameter, said cable having a sheath, the method for adapting comprising the steps of:

providing tape having a high coefficient of friction and having a narrow strip of adhesive applied to one side;

applying said adhesive side of said tape around said cable to form a seal between the cable and the tape;

wrapping said tape around the cable until the diameter of said wrapped cable is equivalent to said first diameter;

placing said wrapped cable into said cable entrance port of said end plate;

contracting said end plate to exert radial force on said wrapped cable wherein said wrapped cable is restrained within said cable entrance port; and securing said end plate within the closure assembly.

* * * * *